Figure 1:
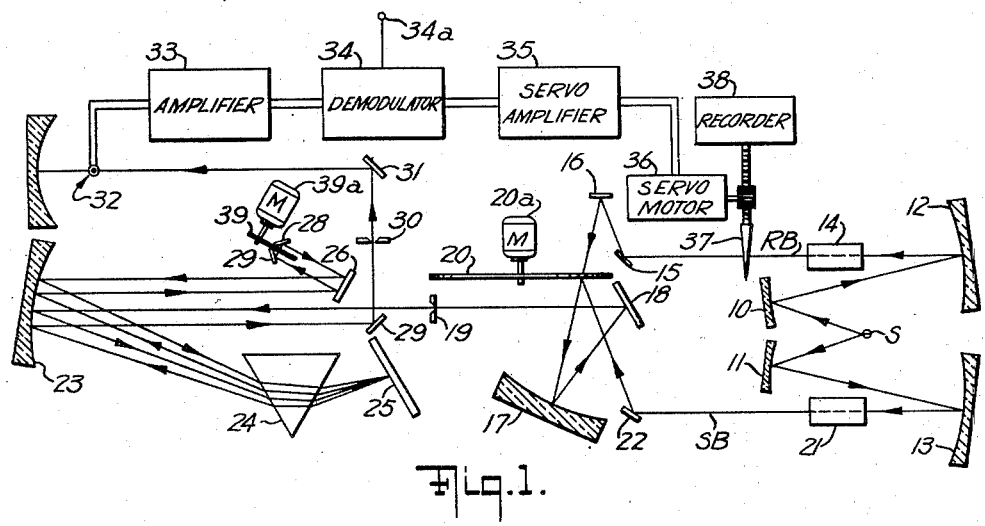

Dec. 24, 1957  E. H. SIEGLER, JR., ET AL  2,817,769
RADIATION COMPARISON SYSTEMS
Filed Nov. 12, 1954  2 Sheets-Sheet 1

INVENTORS
E. HORACE SIEGLER JR.
LARKIN B. SCOTT
BY John W. McLaren
ATTORNEY

2,817,769

RADIATION COMPARISON SYSTEMS

E. Horace Siegler, Jr., Darien, Conn., and Larkin B. Scott, Fort Worth, Tex., assignors to The Perkin-Elmer Corporation, Norwalk, Conn., a corporation of New York Application November 12, 1954, Serial No. 468,356

12 Claims. (Cl. 250—220)

This invention relates to an improved radiation comparison system and is particularly concerned with double beam radiation comparison systems.

Numerous substances, materials, solutions and gases produce characteristic radiation absorption and/or emission spectra which not only differ from each other but are unique for each such substance so that a highly incisive clue as to its fundamental nature is had which in many instances is markedly superior to identification or classification afforded by any other known means.

While techniques and instrumentation which discern such radiation characteristics offer a means of deeply penetrating analyses and comparisons, they are usually so highly sensitive as to be subject to errors due to spurious radiation. Such unwanted radiations constitute sources of error which may be collectively referred to as "stray radiation."

The principal object of the present invention is to suppress and reject unwanted radiation signals in a radiation comparison system.

The present invention is directed to a double beam radiation comparison system where both beams intermittently follow the same path through the system, so as to use the same dispersion means and the same detector. The principal purpose of a double beam as used in an absorption comparison system is to obtain a measure of percent absorption as a function of wavelength automatically. In this type of system there is usually no stringent requirement as to the particular frequency or range of frequencies at which the two beams may be alternately interrupted or modulated so as to effect time-sharing. In some prior art double beam systems, for instance, sound engineering practice has dictated that the two beams be alternately interrupted at a frequency which has a favorable signal-to-noise figure for the particular type of detector employed in the system. Such systems are made to respond only to radiation that fluctuates at the selected frequency and are thus very insensitive to any steady radiation from an outside source. Further, this arrangement renders such systems insensitive to changes in ambient temperature.

Radiation which is modulated at the selected frequency but which reaches the detector without the desired dispersion constitutes stray radiation. In many prior art systems one type of stray radiation results from radiation "scattered" by imperfections in the optical elements which comprise the monochromator. Additional "scattered radiation" can be caused by scattering or reflection from masks or other parts of the system that are in the field of view of the detector.

It has been found advantageous in typical radiation comparison systems to disperse the intermittent beams more than once. A single dispersion means, suitably arranged, may therefore be utilized to effect multiple dispersion by passing the beams through the dispersion means several times. The radiation beams which emerge from two successive dispersions may be designated conveniently as "first pass" and "second pass" dispersions. Such double pass dispersions give rise to an additional problem of unwanted and spurious radiation falling upon the radiation-sensitive detector. Ordinarily, some "first pass" radiation, in addition to the "second pass" radiation will fall upon the radiation-responsive device in the system and both will be simultaneously detected. This may be a source of error inasmuch as the second pass or significant portion of the radiation is contaminated by the first pass radiation mixed with it. In prior art single beam spectrometers, first and second pass radiation is distinguished by arranging the modulating means in the monochromator so that only the second pass radiation is modulated. In such a single beam system, however, unwanted radiation emitted or reflected by the modulator itself can result in stray radiation.

Some prior art double beam radiation comparison systems have employed what may be called a "coding" shutter to interrupt or modulate only that part of the radiation energy which undergoes a second pass dispersion. An example of one such system is that disclosed in the co-pending application S. N. 436,388 filed June 14, 1954 in the names of Vincent J. Coates and Larkin B. Scott.

The present invention contemplates interrupting or modulating the two beams of radiation at two different frequencies so related that the difference in radiation intensity of one beam with respect to the other may be readily detected while unwanted, spurious radiations are rejected and suppressed. A system operating in accordance with the concept and teachings of the present invention accomplishes this while allowing the wanted radiation intelligence to be passed through the system at a frequency having the most favorable signal-to-noise figure.

Assuming for purposes of illustration that the most favorable signal-to-noise figure for a particular type of radiation detector employed in a given system may be secured by detecting the radiation intelligence at a frequency $f$, the present invention contemplates alternating from one beam to another at a frequency $nf$, where $n$ is a positive number not equal to 1, and further modulating the beams at a frequency equal to $(n+1)f$, after the first pass dispersion of the beams, for instance, whence, after appropriate detection through radiation-responsive means, all frequencies except $f$, (the difference frequency between the two modulations), are readily rejected and suppressed. The present invention thus affords a means and method by which radiation signals having repetitive or cyclic characteristics at any other frequency than the frequency $f$, may be effectively eliminated as a source of error. Random radiation errors are also rejected and suppressed in like manner.

In the method and system contemplated by the present invention, $n$ may be any whole number or fraction, other than one. It will be readily recognized that a system might be made to operate in accordance with the present invention by choosing frequencies for the several modulations of the radiation so that the sum frequency rather than the difference frequency will be equal to $f$. In many radiation comparison systems, however, it has been found that detecting the intelligence contained in the radiation signals at a relatively very low frequency is most favorable from a noise figure standpoint. It is, therefore, usually more convenient and desirable to establish higher frequencies as the modulation frequencies so that the difference frequency is equal to $f$, rather than the sum frequency.

It should be borne in mind, however, that both the sum and the difference frequencies may contain useful intelligence with respect to the radiation information contained in one or the other of the two beams notwithstanding the fact that only one of the two frequencies, that is, the sum frequency or the difference frequency, can at any one given time be equal to the frequency $f$ in such a system. Nevertheless, the sum frequency may contain desirable intelligence in usable form. Thus, it may be seen that a number of embodiments of the present invention may vary considerably in form without departing either from the spirit or concept of the present invention.

Figure 2:
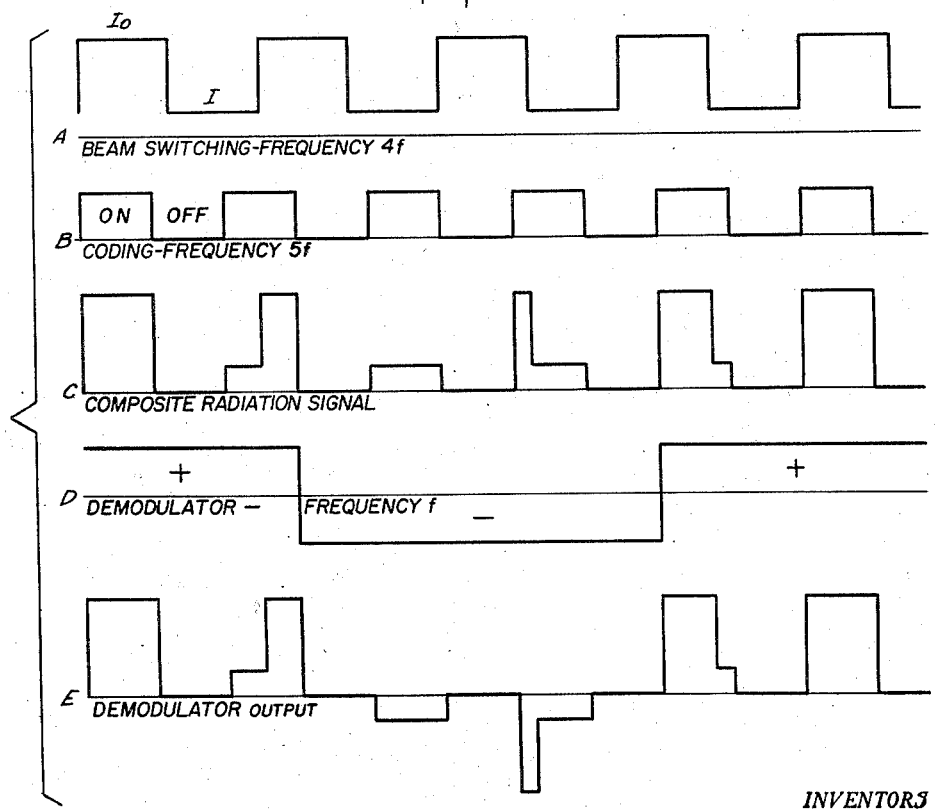
Figure 3:
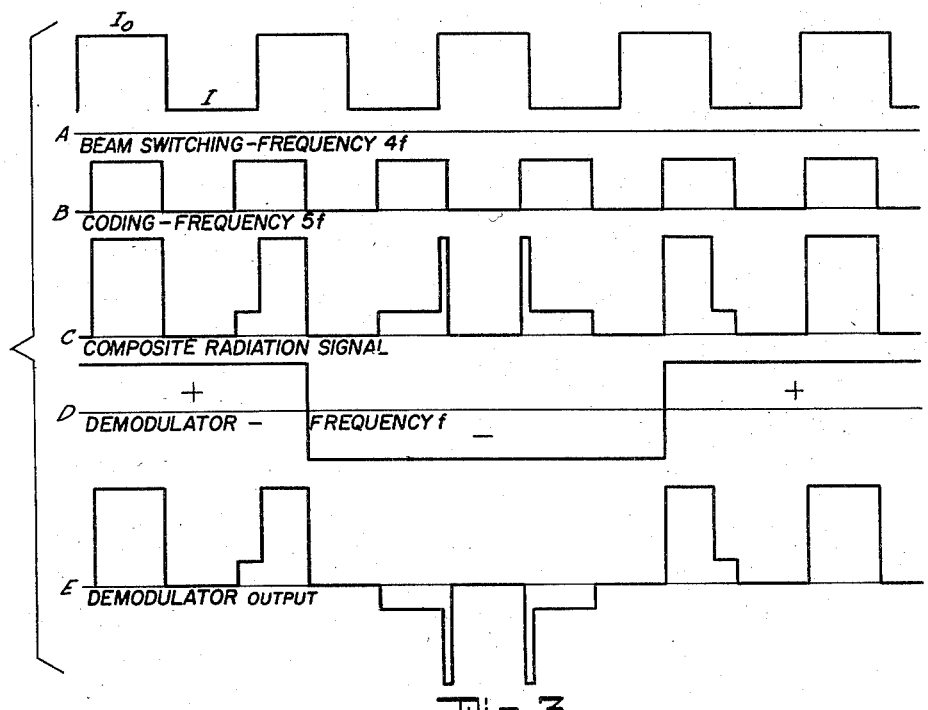
Figure 4:
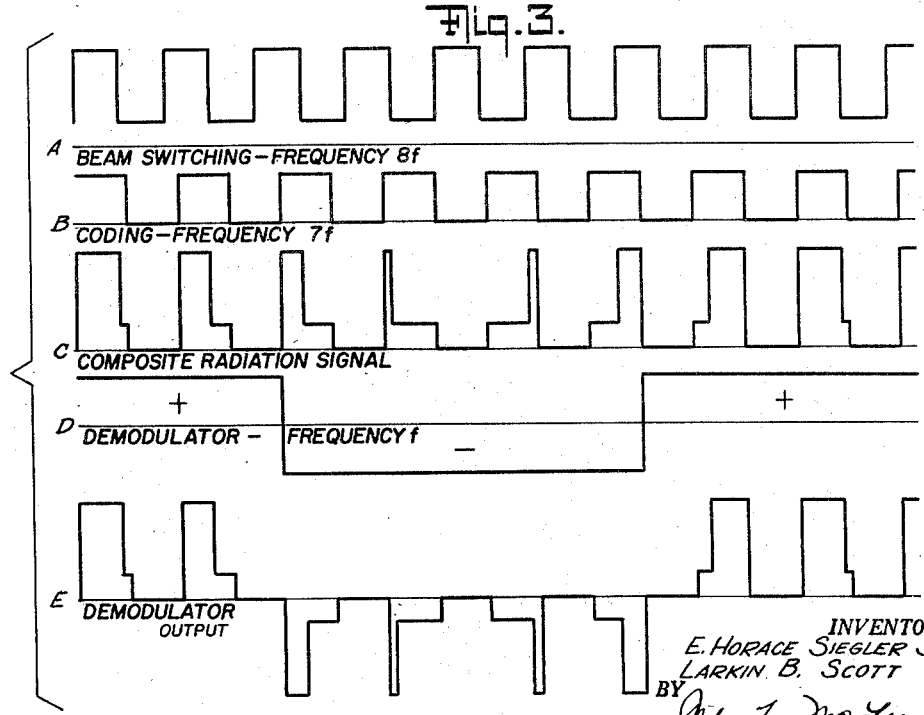

The present invention may be better understood from a consideration of the explanation of the operation of specific embodiments which follows when taken together with the accompanying drawings illustrating several aspects of such operation. In the drawings, Fig. 1 is a schematic diagram of a radiation comparison system embodying the present invention;

Fig. 2 is a set of waveforms illustrating the amplitude vs. time characteristics of typical radiation and electrical signals which may be developed in an embodiment of the present invention such as that shown in Fig. 1;

Fig. 3 is a set of waveforms having the same frequency relationships as those of Fig. 2, but related in time displacement so as to illustrate an optimum operating condition of the embodiment of Fig. 1; and Fig. 4 is a set of waveforms illustrating operation of the apparatus of Fig. 1 in accordance with the present invention but at different frequencies from those illustrated by the waveforms of Figs. 2 and 3.

The apparatus schematically illustrated in Fig. 1 is a double beam radiation comparison system which is also known as a spectrophotometer. Briefly, this instrument is designed so that one of its beams may be passed through a reference cell while the other of its beams is passed through a sample cell containing a sample substance and the nature and character of the sample substance discerned by comparison of its radiation absorption characteristics with the radiation absorption characteristics of the reference cell which is employed as a compensating device. Though the typical embodiment of the present invention shown in Fig. 1 is a radiation absorption comparison system, the practice of the present invention is not limited to such a system but its principles may be equally well applied to a radiation emission system as will appear more fully from an appreciation of the broader fundamentals of the invention, which are disclosed and explained hereinafter.

The embodiment of Fig. 1 uses a single source of radiation such as that shown at S and through the use of spherical mirrors 10 and 11, and 12 and 13, the radiation is directed in two separate beams which are designated RB, for the reference beam, and SB for the sample beam. The sample beam is passed through a sample cell 21 which contains an unknown, or sample substance. The reference beam RB, it will be noted, is passed through a reference cell 14 which may be used to compensate for the radiation absorption of the sample cell itself and thereby provide a reliable base reference. Accordingly, a single source of radiation supplies two beams which are directed so as to pass one of the beams through a reference cell while passing the other through a sample cell. These beams initially have like radiation characteristics and any variations in radiation are substantially consistent in both because they are derived from the same source. Thus, variations in the radiation character of source S do not cause errors in the system inasmuch as both beams will contain the same variations of radiation.

By means of mirrors 15 and 16, the reference beam RB is directed to a mirror 17. From the mirror 17 throughout the remainder of the system there is but one common path for both beams of radiation to follow. Therefore, this common path must be time-shared by both radiation beams. Time-sharing may be effected by a device which will alternately modulate each of the beams in a predetermined degree so that only one of the beams is dominant at a given time. This operation is accomplished in the embodiment of Fig. 1 by the use of a chopping disc 20 driven by a motor 20a and positioned in the path of the reference beam RB between mirrors 16 and 17. The chopping disc 20 may be semi-circular in shape and of such material that will substantially attenuate or completely block radiation of the type employed in the comparison system. Complete interruption of either radiation beam in the system constitutes 100% modulation of the beam so blocked. When the chopping disc 20 is caused to revolve by a motor 20a, the radiation of the reference beam RB is thus modulated or interrupted during one half of each revolution.

As schematically illustrated, the sample beam SB is directed by mirror 22 to the surface of the chopping disc 20. Thus, if the face of the chopping disc 20 to which the sample beam SB is directed, is provided with a reflective surface, the sample beam SB will be reflected to mirror 17 during the same period of time when the path of the reference beam RB from mirror 16 to mirror 17 is interrupted by the chopping disc 20. Conversely, then the reference beam RB is allowed to pass from mirror 16 to mirror 17, the sample beam SB is not reflected to the mirror 17 and time-sharing of the common path of the remainder of the comparison system is thus accomplished. Mirror 17 therefore receives an intermittent reference beam RB and an intermittent sample beam SB which alternate at a frequency dependent upon the rotational speed of chopping disc 20. Time-sharing and alternation of the reference beam and the sample beam are illustrated by waveform A of Fig. 2 wherein radiation intensity is shown as plotted against time. $I_0$ indicates the amplitude of the radiation intensity of the reference beam RB, while I indicates the amplitude of the radiation intensity of the sample beam SB.

Waveform A is typical of the radiation signals which reach mirror 17 whence they are directed by mirror 18 along a path which is common for both beams of radiation throughout the remainder of the comparison system. Thus, a composite of an intermittent reference beam RB and an alternating intermittent sample beam SB passes through entrance slit 19. The composite radiation beam produces a substantially square wave configuration such as waveform A of Fig. 2. The relative amplitude of the square wave depends primarily upon the difference between the intensity of the two beams of radiation.

The composite beam passing through entrance slit 19 falls upon a paraboloidal mirror 23 and is directed to a dispersing element 24 which may be a prism as shown. It should be noted that element 24 operates upon the composite beam so as to change a characteristic other than its radiation intensity. In the particular instance of the embodiment illustrated in Fig. 1, element 24 disperses the radiation of the beam falling upon it. Thus dispersed, the radiation effects greater resolution and enhanced accuracy of the instrument illustrated in this embodiment. It should be recognized that other comparable or analogous operations may be performed upon the composite beam in addition to, or instead of the dispersion which is accomplished in the embodiment of the radiation comparison system shown in Fig. 1.

The radiation beam emerges from the dispersing element 24 in a broadened spectral form, strikes a Littrow mirror 25, and is reflected to the dispersing element 24. The reflected dispersed beam passes through the dispersing element 24 again but in an opposite direction, being again dispersed. The operation by which the radiation beam is passed through a dispersing element in two opposite directions successively shall be referred to herein as a "first pass."

As is well known in the art, a radiation beam may be made to undergo another complete dispersion operation so as to further enhance the resolution and accuracy of the system. To accomplish further dispersion, the radiation beam issuing from dispersing element 24 after its complete "first pass" falls upon paraboloidal mirror 23 and is directed to a mirror 26. The reflective surface of mirror 26 in turn directs the radiation beam to a corner mirror comprised of elements 27 and 28 so as to be redirected to the mirror 26 and paraboloidal mirror 23 along a return path which generally parallels that previously described from dispersing element 24 to corner mirrors 27 and 28, but in an opposite direction.

Again falling upon dispersing element 24, the radiation beam follows a path through the dispersing element, is again reflected by the Littrow mirror 25, and passes through dispersing element 24 in the opposite direction to complete what shall be referred to as a "second pass." The second pass radiation thus issuing from dispersing element 24 falls upon the paraboloidal mirror 23 and is reflected to a mirror 29 which is positioned so as to direct the radiation beam through an exit slit 30. An appropriate reflective device such as the mirror 31 directs the radiation-sensitive detector 32. The detector 32 responds to radiation of the type employed in the system to produce a signal commensurate with the instantaneous intensity of the radiation impinging thereon.

Depending upon the type of radiation employed and the design requisites of the system, a number of different types of detectors may be employed. In one typical embodiment, a thermocouple is used to produce an electrical signal as a function of the instantaneous intensity of the radiation impinging thereon. It will be evident to those skilled in the art, however, that the practice of the present invention is not limited to the employment of one particular type of radiation-responsive detector, nor a particular type of signal issuing therefrom.

The signal produced by detector 32 is usually rather weak, having a maximum amplitude of the order of one microvolt in the embodiment exemplified by Fig. 1, and an appropriate amplifier 33 is therefore employed to amplify the signal produced by the radiation-sensitive detector 32 to a practically usable level. The signal thus amplified is sent through demodulator 34. The demodulator 34, it is to be noted, is cyclically operative and responds to a signal received at the input terminal 34A. As shown by waveform D of Fig. 2, the operation of the demodulator 34 is thus synchronously related to the other periodic operations of the system. The synchronous demodulator 34 produces an output having a direct current component the amplitude of which is a measure between the radiation intensity of the two beams employed in the radiation comparison system and the polarity of the direct current component is indicative of which of the two beams is stronger than the other. An appropriate filter device is usually associated with the demodulator 34 to isolate the desired direct current output signal.

The demodulator output signal, after suitable amplification, may be used to drive a servomotor 36 which, in turn, positions a beam attenuating device 37 in the reference beam RB so as to attenuate the intensity of that beam to match the lesser intensity of the sample beam SB. The relative position of attenuating device 37 is a measure of the ratio of the respective intensities of the two beams and, therefore, is an indication of the difference in radiation intensity of the reference beam RB with respect to the sample beam SB as they both emerge from their respective cells. By arranging a recorder 38 to respond to the positional disposition of attenuating device 37 the variation in the ratio of the intensity of one beam with respect to the intensity of the other beam may be graphically reproduced and permanently preserved.

Thus far, in the description of the embodiment illustrated in Fig. 1, ideal conditions have been assumed throughout. In this connection, it should be realized that the respective paths of the beams illustrated schematically in Fig. 1 are idealized in the sense that stray radiation has not been shown. Since radiation comparison systems are highly sensitive devices, very minute amounts of radiation will be detected and while such small and barely perceptible amounts of radiation may normally be ignored as being indistinguishable for most ordinary purposes, such stray radiation can, and often does, become a troublesome source of error introduced into the desired radiation signals in such systems.

Assuming for purposes of illustration that the embodiment shown in Fig. 1 is an infrared radiation comparison system or spectrophotometer, it may be readily appreciated by those skilled in the art that a number of sources of stray radiation may be present. One of the principal sources of unwanted radiation is the spurious signals due largely to imperfections in the optical path of the system, characterized as "scattered radiation" and constituting a significant portion of the total stray radiation. Another source of error may be, for instance, the moving or rotating parts of the instrument which produce radiation of some small but nonetheless finite measurability. Such radiation error will be referred to herein as "internal" radiation and may have considerable effect by contributing to the stray radiation signals introduced into the system.

Those familiar with the problems of radiation comparison systems will also appreciate the fact that the path of the radiation beams as illustrated in Fig. 1 is very much idealized in that the beams which follow the path and are dispersed by dispersing element 24, are not shown emerging from the dispersing element as a spectrally dispersed beam but on the contrary are shown in a sharply-focused form. This is done in the drawing of Fig. 1 to clarify the axis of the optical path and simplify the explanation of the operation of the system so that a better understanding of the present invention may be had. In actual operation, however, it can be readily appreciated that the dispersed beams do not emerge from the dispersion means 24 as sharply focused as the schematic representation of Fig. 1 would seem to indicate. Unavoidably, some first pass radiation falls upon exit slit 30 along with the desired second pass radiation. The first pass radiation, which is thus mingled with the desired second pass radiation, is directed to the radiation-sensitive detector 32 where it is detected and becomes a further source of unwanted radiation signals which have been collectively referred to as stray radiation. Several forms of comparable unwanted stray radiation may be present in all types of radiation comparison systems. The typical examples of sources of unwanted stray radiation in an infrared spectrophotometer system are used in this instance merely for purposes of illustration.

One expedient by which unwanted first pass radiation contamination may be suppressed is to interpose a modulating device in the path of the composite radiation beam between its first pass and second pass dispersions. Such a device is operated at a frequency that will characterize second pass radiation so that it may be readily distinguished from unwanted first pass radiation. Such second pass radiation modulation therefore affords a basis by which stray radiation having different frequency characteristics may be rejected and suppressed. This suppression is usually done by electronic means incorporated into the comparison system and may be inherent in the operation of the demodulator, for instance.

Modulation of the second pass radiation may be accomplished by a means 39 much like that of the chopping disc 20 in shape and driven by a motor 39a. The present invention conceives a system which, by operating upon the radiation to be detected in a series of properly related steps, affords a method and means of substantially rejecting stray radiations.

In the following explanation of the operation of the present invention, it will be assumed that the intelligence to be demodulated and extracted from the radiation signal reaching the radiation-sensitive detector 32 has a characteristic frequency which may be designated as $f$. In accordance with the present invention, the chopping disc 20, which switches the system from one beam to the other, is operated at such a speed by appropriate control of motor 20a so as to modulate or switch the beams at a frequency $nf$ where $n$ is not equal to 1. After the radiation beam has been operated upon by changing a characteristic other than intensity as, for instance, dispersing it spectrally, the radiation is further modulated at a frequency $(n+1)f$ by a means such as the coding disc shown at 39 in Fig. 1. The radiation beam is thus successively modulated at two frequencies which have a difference frequency of $f$. A demodulator responsive only to the intelligence contained in the $f$ frequency component of the radiation signal, will effectively suppress all other frequencies contained in an electrical signal which is a function of the instantaneous intensity of the composite radiation beam.

Fig. 2 illustrates the waveforms of the radiation and electrical signals developed in such a system where $n$ is equal to four. Waveform A of Fig. 2 shows the composite radiation beam which would fall upon paraboloidal mirror 17 of Fig. 1 as a result of the alternate interruptions of the reference beam RB and the sample beam SB by the rotating chopping disc 20. The reference beam RB usually has the greater intensity of the two and is shown in waveform A to have an amplitude of $I_0$ while the sample beam SB has a somewhat lesser amplitude of I.

It is to be borne in mind that the difference in intensity between the reference beam RB and the sample beam SB will vary considerably in a typical run of the instrument throughout the spectrum of the radiation beam. However, for purposes of illustration and in the interest of simplicity and clarity, the waveforms illustrating the operation of the present invention as in Figs. 2 and 3, for instance, show a substantially constant difference in intensity between the reference beam RB and the sample beam SB under the assumption that a relatively very small portion of the spectral band is illustrated by the relationships of these waveforms. Therefore, for all practical purposes, these waveforms may be assumed to illustrate a virtually instantaneous operation of the system. It will also be well to bear in mind that all waveforms illustrate ideal response and actual operation may not produce quite as sharply defined square waves.

Waveform B of Fig. 2 illustrates the frequency at which the modulating device operates upon the radiation before its second pass dispersion. A comparison of the relative frequencies of waveforms A and B will reveal that waveform A completes four full cycles during the same time period in which waveform B completes five full cycles. In this particular system, therefore, $n$ may be said to be equal to four and the waveform A represents the frequency $nf$, whereas waveform B represents the frequency $(n+1)f$. The switching action from one beam to the other as illustrated by waveform A, combined with the modulating action of the second pass radiation, as exemplified by waveform B, produces a composite radiation beam substantially of the waveform configuration of radiation intensity as shown in waveform C.

The instantaneous intensity of the composite radiation beam will vary with respect to time as shown by the waveform C, and is detected in the system by a radiation-sensitive device such as that shown at 32 in Fig. 1 which produces a signal as a function of the instantaneous intensity thereof. It may therefore be validly assumed that waveform C not only illustrates the intensity of the composite radiation beam but is also substantially representative of the configuration of the output signal produced by the radiation-sensitive detector 32 and particularly the component at the frequency $f$.

The output signal of detector 32 may be an electrical signal which is fed to a suitable amplifier 33. This may be a direct current amplifier or an alternating current amplifier. In the instance where an alternating current is employed in the system, a ground reference will be established which will be somewhat different from that of a direct current amplifier similarly employed. The system, however, will operate in substantially the same manner in either case. Therefore, for purposes of illustration and in the interest of simplicity, it will be assumed that a direct current amplifier is employed in the system and produces an output signal which also has substantially the configuration of waveform C.

An inspection of waveform C will reveal that it has a component at the frequency $f$. By employing a suitable demodulator which is responsive only to the frequency $f$, a sensible measure of the difference in radiation intensity between the two beams may be had, while stray radiations having characteristics which are repetitive at different frequencies are effectively suppressed. One such demodulator employed in a typical embodiment of the present invention is comprised of a gated diode bridge which is synchronously operative at the frequency $f$ to perform a switching function. Such a demodulator is therefore a bi-directional switch and, in a typical embodiment of the present invention, performs its switching operation at the frequency and time relationship with respect to the modulation frequencies of the system as illustrated by waveform D of Fig. 2.

It will be noted that the demodulator completes one full cycle of operation in the same time period during which the chopping disc completes four full cycles of operation. If, as it was previously assumed, the chopping disc is operating at a frequency $4f$, the demodulator is then operating at a frequency $f$. The demodulated output of demodulator 34 will have a configuration substantially that of the waveform shown at E of Fig. 2. The demodulated output is seen to have a direct current component which is a function of the difference in radiation intensity between the two beams and a measure thereof. The polarity of the direct current component is indicative of which beam is the stronger of the two being compared. In accordance with the present invention, the modulations contained in the composite radiation beam which is detected by the radiation-sensitive device are $nf$ and $(n+1)f$ where $n$ is not equal to 1. As may be seen from the typical relationships shown in the waveforms of Fig. 2, the modulation frequencies may be several times the basic frequency $f$.

The system may be, of course, operated at frequency relationships in accordance with the present invention wherein $n$ is equal to a fraction less than 1. However, the practical advantages of operating at higher frequencies such as four and five times $f$, for instance, will become immediately apparent upon consideration of the facility with which such frequencies may be distinguished from the frequency $f$ and thereby expedite the suppression and rejection of stray radiations contained therein.

An additional practical consideration which favors the use of higher frequencies for the successive operations at $nf$ and $(n+1)f$ is the fact that the development of subharmonics of the higher frequencies having significant amplitudes of signal strength at the frequency $f$ is quite unlikely.

Fig. 3 illustrates waveforms developed and utilized in a system operating in accordance with the present invention wherein $n$ equals four and the modulations detected by the radiation-sensitive device in the systems are at the frequencies $4f$ and $5f$, respectively. However, the secondary or coding modulation has been shifted in time with respect to the switching operation exemplified by waveform A, so as to produce the symmetrically modulated radiation pattern illustrated by waveform C. A demodulator responsive only to the frequency $f$ and operating in the time displacement relationship as illustrated by waveform D of Fig. 2 produces an output having substantially the configuration of waveform E. This latter waveform, it will be seen, is considerably more symmetrical in appearance than the waveform E of Fig. 1, though it contains a similar direct current component which is substantially a function of the difference between the intensity of the two beams.

An embodiment of the present invention operating in accordance with the frequency and time displacement relationships as illustrated by the waveforms of Fig. 3 has the principal advantage of a more favorable signal-to-noise ratio. It should be noted that the practice of the present invention is not limited to switching the two beams at the lower frequency and further modulating or coding the beams at the higher frequency, but may be equally as well practiced by switching beams at the higher frequency and further modulating or coding the beams at the lower frequency. This will produce a difference frequency in the same manner as has previously been described with respect to specific embodiments operating to generate and utilize the waveforms of Figs. 2 and 3.

Additionally, it is to be noted that a system operating in accordance with the concept of the present invention produces a useful intelligence signal contained in the sum frequency, as well as the difference frequency. The utilization of such information as may be contained in a sum frequency derived from a system operating in accordance with the present invention is, as will be evident to those skilled in the art, an obvious equivalent of the embodiment described hereinbefore. Utilizing desirable intelligence contained in both the sum frequency and difference frequency components derived from a system operating in accordance with the present invention, wherein either the sum or the difference frequency may be equal to $f$, is within the contemplation of the present invention and the examples given in connection with the disclosed embodiments are intended to be merely illustrative and not limiting as to the scope and concept of the invention.

In some types of instruments, however, there are very definite disadvantages to operating upon the radiation beams so as to modulate them at sufficiently low frequencies to produce a sum frequency equal to $f$. In one type of instrument embodying the present invention, it has been found advantageous to establish the frequency $f$ as being equal to thirteen cycles per second, principally because of the desirable signal-to-noise ratio at that particular frequency. The practical difficulties of utilizing extremely low frequencies to modulate the intensity of the radiation beams so as to effect a sum frequency equal to thirteen cycles per second in accordance with the present invention are quite apparent. Thus, though a system may be readily conceived to utilize the sum frequency of the two modulating frequencies in accordance with the teachings of the present invention, such a system may involve serious practical difficulties in some instances. These considerations are, however, largely dependent upon design requisites of the particular system and engineering problems such as are usually involved in practical product development.

Fig. 4 is a series of waveforms graphically depicting the configurations of the several signals generated and utilized in a system operating in accordance with the present invention wherein $n$ is equal to seven. From an inspection of waveform A of Fig. 4 as compared with waveform B of the same figure, it will be seen that eight complete cyclic periods of waveform A are equal to seven complete cyclic periods of waveform B. This relationship, therefore, indicates that the switching modulation is accomplished in this particular system at $(n+1)f$, or $8f$ where $n$ is equal to seven. The coding modulation is accomplished at the frequency $nf$, which in this instance is equal to $7f$. Thus, it is seen that in this system the switching operation between the two beams to be compared is accomplished at the higher frequency while the secondary modulation or coding of the second pass radiation is accomplished at the lower of the two modulating frequencies.

These successive operations upon the radiation beams to be compared produce a radiation intensity signal substantially of the configuration of waveform C of Fig. 4. Demodulation and detection of the $f$ frequency component contained in the waveform C is accomplished in a manner similar to that previously described in connection with other embodiments of the present invention and a bi-directional switching type demodulator operating as indicated by waveform D produces an output substantially as depicted by waveform E of Fig. 4. As in other embodiments of the present invention, the output as shown by waveform E contains a direct current component which is a measure of the difference in intensity between the two beams of radiation to be compared. This information may be observed on an appropriate indicator, recorded by suitable means, or utilized to actuate a servo-mechanism loop included in the instrument whereby the stronger of the two radiation beams will be attenuated so as to be equal in intensity to the other beam. In the latter type of null system, the amount of attenuation necessary to equalize the two radiation beams is a measure or indicium of the initial difference in intensity of the two beams.

The advantages of the present invention as compared with prior art schemes will be apparent to those familiar with radiation comparison instrumentation. The principles and teachings of the present invention afford the virtual elimination of the troublesome effects of the major sources of stray radiation signals by the rejection of such stray radiation signals present in the usable output signal of the system. Though not the only sources, three typical sources of such unwanted stray radiation are (1) scattered radiation due to imperfections in the optical path; (2) first pass radiation which contaminates second pass radiation; and (3) internal radiation emanating from moving or rotating parts. The first of these sources, i. e., scattered radiation, is reduced to a minimum by coding the multiple dispersion accomplished in the system. The second source of stray radiation, i. e., first pass radiation which contaminates the desirable second pass radiation signals, has a frequency characteristic dependent upon the speed of operation of the switching or time-sharing device. In accordance with the present invention, the operating frequency of the switching or time-sharing device is chosen at either $nf$ or $(n+1)f$. Thus, first pass radiation detected by the radiation responsive device of the system will have a frequency characteristic which renders it readily distinguishable from the frequency $f$. The third major source of stray radiation, i. e., internal radiation, will have a frequency characteristic dependent upon the operative frequency of the moving elements in the system wherein it originates. Thus, it too is readily distinguishable from the frequency $f$ containing the desired information. In accordance with the successive steps which achieve modulations having the frequency relationships conceived by the present invention, these three major sources of stray radiation are therefore effectively suppressed by being rendered easily distinguishable in the output signal. The relationships of the particular frequencies employed in accordance with the present invention, however, are such that not only facilitate the rejection and suppression of stray radiations but also produce a twice-modulated output signal having a frequency component $f$ which component is a measure of the difference between the intensity of the beams to be compared in the radiation comparison system.

The flexibility of the present system affords the use of relatively high frequencies for the switching frequency as well as the coding frequency so that the stray radiation components having those frequency characteristics may be rejected and suppressed more completely and expeditiously in the demodulation stage of the system. Moreover, the use of a relatively higher frequency for time-sharing or beam switching greatly reduces uncompensation effects which result from rapid scanning of the radiation spectrum.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

We claim:

1. A radiation comparison system comprising means for generating two beams of like radiation, means for directing said beams on a common path, means for operating upon said beams to alternately time-share said common path at a frequency $nf$, where $n \neq 1$, means for changing a characteristic of said combined beams other than intensity, means for modulating said beams at a frequency $(n+1)f$, radiation-responsive means positioned to receive said beams for producing a signal as a function of the instantaneous intensity thereof, and a demodulator arranged to receive said radiation intensity signal and adapted to produce a signal commensurate with the $f$ frequency component of its input, whereby the output of said demodulator is a measure of the difference between the radiation intensity of said two beams and unwanted radiation signals are rejected.

2. A radiation comparison system comprising means for generating two beams of like radiation, means for alternately modulating the intensity of said beams at a frequency $nf$, where $n \neq 1$, means for dispersing said modulated beams, means for modulating said dispersed beams at a frequency $(n+1)f$, radiation-responsive means positioned to receive said beams for producing a signal as a function of the instantaneous intensity thereof, and means arranged to receive said radiation intensity signal for producing a signal commensurate with the $f$ frequency component of its input, whereby the output of said means is a measure of the difference between the radiation intensity of said two beams and unwanted radiation signals are rejected.

3. A radiation comparison system comprising, a source of radiation, means for forming said radiation into two like beams, means for alternately modulating the intensity of said beams at a frequency $nf$, where $n \neq 1$, means for dispersing said modulated beams at least twice, means for modulating said dispersed beams at a frequency $(n+1)f$, radiation-responsive means positioned to receive said beams for producing a signal as a function of the instantaneous intensity thereof, and a demodulator arranged to receive said radiation intensity signal and adapted to produce a signal commensurate with the $f$ frequency component of its input, whereby the output of said demodulator is a measure of the difference between the radiation intensity of said two beams and unwanted radiation signals are rejected.

4. A radiation comparison system comprising, a source of radiation, means for forming said radiation into two like beams, means for alternately interrupting said beams at a frequency $nf$, where $n \neq 1$, means for dispersing said intermittent beams at least twice, means for modulating said dispersed beams at a frequency $(n+1)f$, radiation-responsive means positioned to receive said beams for producing a signal as a function of the instantaneous intensity thereof, and a demodulator arranged to receive the output signal of said radiation-responsive means and adapted to produce a signal commensurate with the $f$ frequency component of its input, whereby the output of said demodulator is a measure of the difference between the radiation intensity of said two beams and unwanted radiation signals are rejected.

5. A radiation comparison system comprising a source of radiations, means for forming said radiation into two like beams, means for alternately modulating the intensity of said beams at a frequency $nf$, where $n \neq 1$, means for dispersing said modulated beams at least twice, means interposed in the paths of said beams immediately before their last dispersion for modulating said beams at a frequency $(n+1)f$, radiation-responsive means positioned to receive said beams for producing a signal as a function of the instantaneous intensity thereof, and a demodulator arranged to receive said radiation intensity signal and adapted to produce a signal commensurate with the $f$ frequency component of its input, whereby the output of said demodulator is a measure of the difference between the radiation intensity of said two beams and unwanted radiation signals are rejected.

6. A radiation comparison system comprising a source of radiation, means for forming said radiation into two like beams, means for alternately modulating the intensity of said beams at a frequency $nf$, where $n \neq 1$, means for dispersing said modulated beams twice, means for modulating said beams at a frequency $(n+1)f$ between said first and second dispersions, radiation-responsive means positioned to receive said beams for producing a signal as a function of the instantaneous intensity thereof, and a demodulator arranged to receive said radiation intensity signal and adapted to produce a signal commensurate with the $f$ frequency component of its input, whereby the output of said demodulator is a measure of the difference between the radiation intensity of said two beams and unwanted radiation signals are rejected.

7. A radiation comparison system comprising means for generating two beams of like radiation, means for directing said beams on a common path, means for operating upon said beams to alternately time-share said common path at a frequency $nf$, where $n \neq 1$, means for dispersing said combined beams, means for equally modulating said dispersed beams at a frequency $(n+1)f$, radiation-responsive means positioned to receive said beams for producing a signal as a function of the instantaneous intensity thereof, a demodulator arranged to receive said radiation intensity signal, said demodulator being synchronously operative at the frequency $f$ for detecting the $f$ frequency component of its input, whereby the output of said demodulator is a measure of the difference between the radiation intensity of said two beams and unwanted radiation signals are rejected.

8. A radiation comparison system comprising, means for generating two beams of like radiation, means for alternately modulating the intensity of said beams at a frequency $nf$, where $n \neq 1$, means for dispersing said modulated beams at least twice, means for modulating said dispersed beams at a frequency $(n+1)f$, radiation-responsive means positioned to receive said beams for producing a signal as a function of the instantaneous intensity thereof, a demodulator arranged to receive said radiation intensity signal, said demodulator including a full-wave rectifier alternately conductive in opposite polarities at a frequency $f$, whereby the output of said demodulator is a measure of the difference between the radiation intensity of said two beams and unwanted radiation signals are rejected.

9. A radiation comparison system comprising means for generating two beams of like radiation, means for alternately modulating the intensity of said beams at a frequency $nf$, where $n \neq 1$, means for dispersing said modulated beams at least twice, means for modulating said dispersed beams at a frequency $(n+1)f$, radiation-responsive means positioned to receive said beams for producing a signal as a function of the instantaneous intensity thereof, a demodulator arranged to receive said radiation intensity signal, said demodulator being synchronously operative at the frequency $f$ for producing an output signal as a function of the difference in the intensity of radiation between said two beams, and a servomechanism adapted to respond to the output signal of said demodulator for attenuating the radiation intensity of the stronger of said two beams, whereby the degree of attenuation necessary to null the system is a measure of the initial difference between the radiation intensity of said two beams and unwanted radiation signals are rejected.

10. The method of suppressing unwanted radiation signals in a radiation comparison system which comprises the steps of modulating the radiations to be compared at the frequencies $nf$ and $(n+1)f$, where $n \neq 1$, and detecting the $f$ frequency component of the radiations to be compared.

11. The method of suppressing unwanted radiation signals in a radiation comparison system which comprises the successive steps of operating upon the radiations to be compared to alternately time-share a common path at the frequency $nf$, where $n \neq 1$, amplitude modulating the radiations to be compared at a frequency $(n+1)f$, and detecting the $f$ frequency component of the radiations to be compared.

12. The method of suppressing unwanted radiation signals in a radiation comparison system which comprises the successive steps of operating upon the radiations to be compared to alternately time-share a common path, amplitude modulating the radiations in said common path, one of the operations of said first two steps being effected at a frequency of $nf$ where $n \neq 1$ and the other at a frequency of $(n+1)f$, and the further step of detecting the $f$ frequency component of the radiations to be compared.

References Cited in the file of this patent

UNITED STATES PATENTS

| | | |
|---|---|---|
| 2,525,445 | Canada | Oct. 10, 1950 |
| 2,547,212 | Jamison | Apr. 3, 1951 |
| 2,604,810 | Backhouse | July 29, 1952 |
| 2,652,742 | Walsh | Sept. 22, 1953 |
| 2,679,010 | Luft | May 18, 1954 |
| 2,680,989 | Savitzky et al. | June 15, 1954 |

FOREIGN PATENTS

| | | |
|---|---|---|
| 873,671 | France | Mar. 30, 1942 |

OTHER REFERENCES

Article by J. U. White and M. D. Liston on "Construction of a Double Beam Recording Infra Red Spectrophotometer" in the Journal of the Optical Society of America, vol. 40, No. 1, January 1950; pp. 29–40.